United States Patent
Balachandran et al.

(10) Patent No.: US 8,296,617 B2
(45) Date of Patent: Oct. 23, 2012

(54) METHOD AND APPARATUS OF HARQ PROCESS SELECTION

(75) Inventors: Krishna Balachandran, Morganville, NJ (US); Nandu Gopalakrishnan, Madison, NJ (US); Joseph Kang, Belle Mead, NJ (US); Achilles Kogiantis, New York, NY (US)

(73) Assignee: Alcatel Lucent, Paris (FR)

( * ) Notice: Subject to any disclaimer, the term of this patent is extended or adjusted under 35 U.S.C. 154(b) by 863 days.

(21) Appl. No.: 12/380,379

(22) Filed: Feb. 25, 2009

(65) Prior Publication Data

US 2010/0218065 A1   Aug. 26, 2010

(51) Int. Cl.
    H04L 1/18   (2006.01)
(52) U.S. Cl. .................. 714/749; 714/750; 714/751
(58) Field of Classification Search ........... 714/748–751
    See application file for complete search history.

(56) References Cited

U.S. PATENT DOCUMENTS

2005/0207374 A1* 9/2005 Petrovic et al. ............... 370/331

OTHER PUBLICATIONS

3rd Generation Partnership Project 2, "Overview for Ultra Mobile Broadband (UMB) Air Interface Specification," 3GPP2 C.S0084-000-0, v2.0, Aug. 2007, http://www.3gpp2.org/Public_html/specs/C.S0084-000-0_v2.0_070904.pdf.
R. Bachl et al., "The Long Term Evolution Towards a New 3GPP Air Interface Standard," Bell Labs Tech. J., 11(4)(2007), pp. 25-51.
*IEEE Standard for Local and Metropolitan Area Networks* ,"Part 16: Air Interface for Fixed and Mobile Broadband Wireless Access Systems, Amendment 2: Physical and Medium Access Control Layers for Combined Fixed and Mobile Operation in Licensed Bands and Corrigendum 1", IEEE Std 802.16e™—2005 (Amendment and Corrigendum to IEEE Std 802.16-2004), Dec. 2005, Sections: Cover Sheet and Introduction (i-ix) & Table of Contents, 8.4.9.4.3.1-8.4.10.3 (pp. 634-636) and 8.4.13.3-9.1.2 (pp. 648-651).
Wei Yu et al., "Optimal Power Control in Multiple Access Fading Channels With Multiple Antennas", Proc. IEEE Internat. Conf. on Commun. (ICC'01)(Helsinki, Fin., 2001), Vo. 2, pp. 575-579.
3rd Generation Partnership Project; Technical Specification Group Radio Access Network; High Speed Downlink Packet Access (HSDPA); Overall description; Stage 2 (Release 7), 3GPP TS 25.308, V7.0.0, Mar. 2006, pp. coversheet-28.
Pramod Viswanath et al., "Asymptotically Optimal Water-Filling in Vector Multiple-Access Channels", IEEE Transations on Information Theory, vol. 47, No. 1, Jan. 2001, pp. 241-267.

* cited by examiner

*Primary Examiner* — Guy Lamarre
(74) *Attorney, Agent, or Firm* — M. I. Finston (57) ABSTRACT

A method for implementation of HARQ between a transmitting node and a receiving node in a communication network is provided. HARQ processes may be selected from a list for instantiation according to a policy that may deviate from strict first-in, first-out processing of packets. The greater flexibility that this affords may lead to improved efficiency in the use of transmission resources.

9 Claims, 5 Drawing Sheets

METHOD AND APPARATUS OF HARQ PROCESS SELECTION

FIELD OF THE INVENTION

This invention relates to communication networks in which Hybrid Automatic Repeat Request (HARQ) is implemented.

ART BACKGROUND

HARQ is a well-known method of error recovery used, for example, in mobile WiMAX, Third Generation Partnership Project (3GPP) UMTS and Long Term Evolution (LTE), and cdma2000 1x-EVDO standards based access networks networks. In HARQ implementations, a receiver may request retransmission of a data packet if an error-free packet was not received. Received soft information corresponding to the defective packet may be stored, however, and used by the receiver in combination with one or more retransmitted packets to recover the originally transmitted data. A HARQ "process" is initiated upon initial transmission of adata packet, and continues to remain in the queue (i.e., awaiting allocation of resources for transmission upon receipt of a negative acknowledgment for a previous transmission) until it until it is terminated. The process may be terminated, for example, when the receiver sends an acknowledgement signal ("ACK"), a time limit is reached, or the number of retransmissions reaches a maximum permissible value.

In typical wireless networks, for example, a base station serves a plurality of users. One or more users are scheduled for service in each of a plurality of scheduling instances. (In certain types of networks, scheduling instances are referred to as "frames," "Transmission Time Intervals" or "time slots"). Each user may have one or more HARQ processes waiting to be served. Once a user has been selected for service in a given scheduling instance, network resources must be allocated to one or more of the selected user's existing HARQ processes in the queue. In current systems, a new process process may be "instantiated", i.e., enabled for transmission, if there are no existing processes in the queue or if the existing processes are locked. A process is said to be locked if it is still awaiting an acknowledgment or negative acknowledgment from the receiver in response to a transmission attempt. In the context of wireless networks, the resources to be allocated are air-interface resources. In the specific context of networks that employ OFDMA as a multiplexing technique, such as WiMAX or 3GPP LTE networks, resources are allocated in time-frequency units. Each such unit consists of a number of OFDM symbols and a number of frequency subcarriers (referred to as subchannels in mobile WiMAX).

Previous approaches to the selection of HARQ processes for transmission have applied a first-in-first-out (FIFO) policy, which favors the transmission of the oldest packets ahead of newer packets. Such an approach has generally been preferred because it tends to reduce out-of-sequence delivery, and also reduces the accumulation of large packet-transmission delays.

However, strict adherence to a FIFO policy may under at least some circumstances lead to inefficiencies in the utilization of network resources. Accordingly, there is a need for further process-selection methods that may achieve more efficient resource utilization.

SUMMARY OF THE INVENTION

We have developed a method of selecting HARQ processes that can achieve improved efficiency in the utilization of network resources. Accordingly, in one embodiment, our invention is a method for implementation of HARQ between a transmitting node and a receiving node in a communication network of the kind in which HARQ data packets associated with one or more HARQ processes are transmitted using allocated resources. Each HARQ process may comprise a transmission of one or more new or retransmitted HARQ packets having a common destination.

In an exemplary embodiment, the method comprises, for at least one user selected at a scheduling instance, appending one or more new candidate HARQ processes to a group of existing candidates for possible instantiation. Such appending of new candidates is permitted even if there are older processes with data waiting to be retransmitted.

In the exemplary embodiment, the method further comprises ranking two or more processes queued for the selected user. Such ranking is carried out by applying a policy which can deviate from first-in-first-out processing of packets by favoring younger packets over older packets for priority.

In the exemplary embodiment, the method further comprises selecting one or more of the highest ranked HARQ processes for instantiation in the scheduling instance using allocated resources.

DETAILED DESCRIPTION

Figure 1:
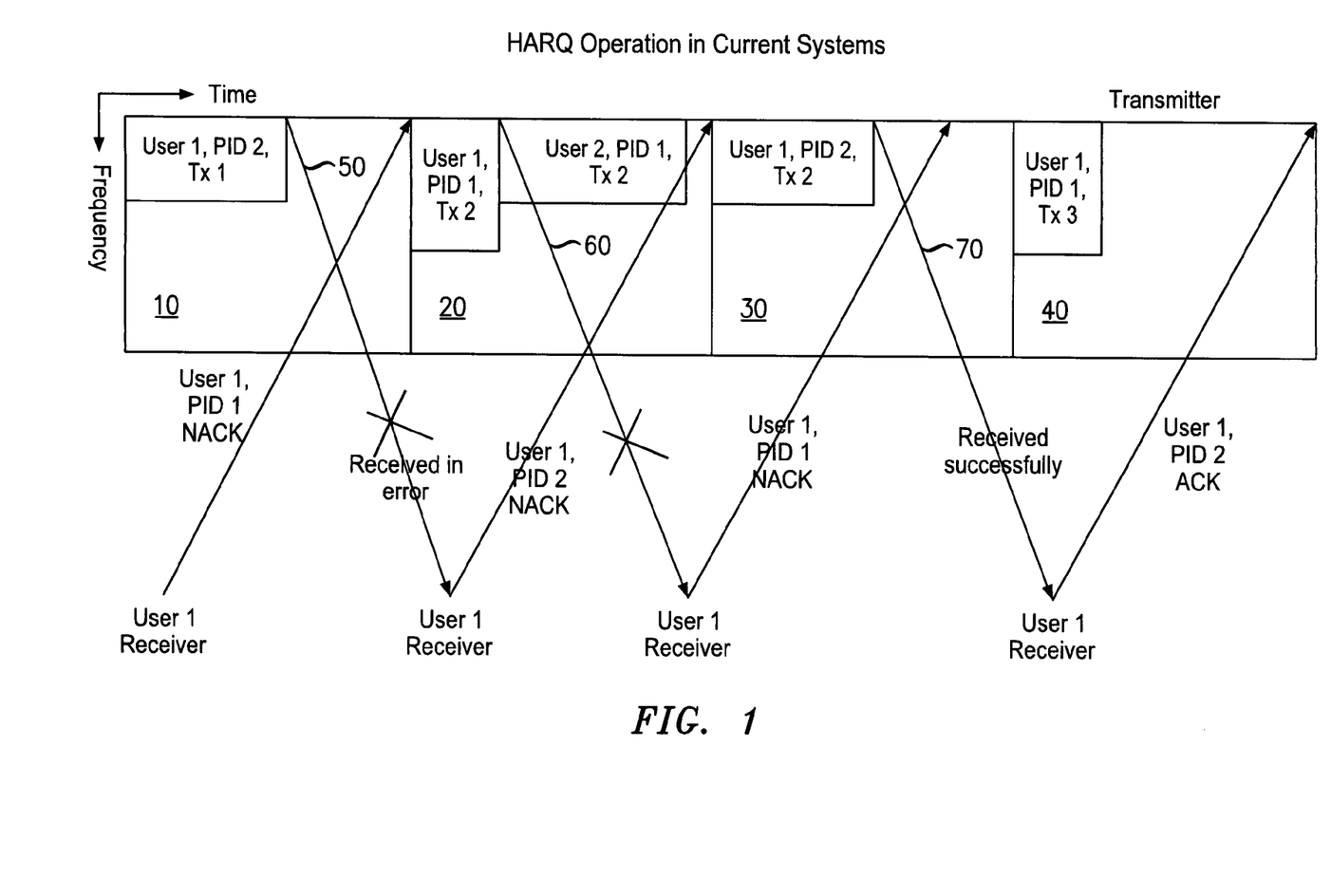
FIG. 1 is a schematic representation of resource allocation and message transmission according to HARQ operation in conventional communication networks.

Turning to the HARQ operation illustrated in FIG. 1, which is typical of those performed in conventional networks, it will be seen that four sequential frames 10, 20, 30, 40 are depicted. As shown, each frame is a block of time and frequency resources, and represents a scheduling region in which time and frequency can be allocated.

As shown, time-frequency resources have been allocated to User 1 in all four blocks, and to User 2 in block 20. Transmission 50 is an original packet (hence the lable "Tx1") from User 1 for its process 2, as indicated by the label, "PID 2" (Process Identity 2). The receiver fails to receive an error-free packet, and therefore returns a NACK. While the NACK is pending, PID 2 is locked. At block 30, User 1 sends retransmission 70 (Tx 2), which is received successfully. At block 20, User 1 receives a NACK corresponding to an earlier process, PID 1. Because PID 2 is locked in block 20, User 1 is able to send retransmission 60 (User 1, PID 1, Tx 2), which is not received error-free and which therefore causes a NACK to be returned.

As noted above, the selection of HARQ processes will typically take place user-by-user; that is, a particular user will be chosen for service in a given scheduling instance, and then one or more processes of that user will be selected. However, it may sometimes be the case that a particular connection is first chosen for service in the scheduling instance, and one or more processes associated with that connection are selected. In the description and claims that follow, we will use the term "user" in this regard to include both users and connections.

A user (as noted above, a connection is also deemed a "user" in this regard) that has been selected for scheduling in the current frame may have one or more HARQ packets slated for initial (sometimes referred to as "fresh") transmission. Similarly, the selected user may have one or more HARQ packets that have been slated for re-transmission, due, e.g., to errors or delays in transmission or feedback. At times, the selected user may have no HARQ packets to transmit or to retransmit.

When a given user has more than one HARQ process waiting for transmission, HARQ process selection determines the process or processes that will make transmission attempts over the allocated resources. HARQ process selection may take into account any of various factors, including throughput requirements, delay requirements, or other constraints related to QoS, as well as, e.g., estimates of the probability of successful packet transmission and constraints specified by applicable industry standards.

The manner in which HARQ process selection is carried out may also be affected by a feature of some networks referred to as Collaborative Spatial Multiplexing (CSM). Other terms sometimes used for CSM are Multi-User Multiple Input Multiple Output (MU-MIMO), and Virtual or Collaborative Uplink MIMO. Detailed technical descriptions of CSM may be found, for example, in 3rd Generation Partnership Project 2, "Overview for Ultra Mobile Broadband (UMB) Air Interface Specification," 3GPP2 C.S0084-000-0, v2.0, August 2007, http://www.3gpp2.org/Public_html/specs/C.S0084-000-0_v2.0_070904.pdf, as well as in R. Bachl et al., "The Long Term Evolution Towards a New 3GPP* Air Interface Standard," *Bell Labs Tech. J.*, 11:4 (2007), 25-51, and also in Institute of Electrical and Electronics Engineers, *IEEE Standard for Local and Metropolitan Area Networks*—Part 16: Air Interface for Fixed Broadband Wireless Access Systems, IEEE 802.16-2004, June 2004.

Very briefly, CSM allows multiple transmitters, each equipped with one or more transmit antennas and associated with the same sector, to simultaneously transmit on the same set of time-frequency resources. Such simultaneous transmission may increase the net spectral efficiency, the peak aggregate transmission rate, throughput, and/or coverage.

As noted above, once a user has been selected for transmission, it may be necessary to select one of many candidate HARQ processes for transmission. There are numerous reasons why a given user might accrue multiple HARQ processes. For example, the user might be engaged in multiple simultaneous connections, such as a voice call concurrently with a Web-browsing activity. Or, for example, packets may simply have become queued up because resource contention has limited the opportunities for transmission. Or, as yet another example, a previously transmitted process might be waiting for an acknowledgement (ACK) or negative ACK (NACK) and might instantiate new HARQ processes for transmission in the interim.

Some currently known standards provide feedback and signaling features that may be used to support various methods of radio resource allocation. Signaling features, for example, may be used to indicate CSM transmissions. Currently known standards do not specify the precise manner in which HARQ processes are to be selected. However, standards may impose constraints on the manner in which HARQ process selection may be carried out. In some circumstances, for example, there might be a requirement for the respective, simultaneous CSM transmissions from collaborating users to span exactly the same time-frequency resources. On the other hand, it is often advantageous to permit the transmission size to change from one transmission to the next, depending on factors such as the amount of data in the user's queue, available resources remaining in the current frame, transmission power levels and maximum power constraints (particularly for the uplink), and feasibility to achieve a target data rate or post HARQ error rate.

In the absence of CSM, a typical HARQ process selection according to conventional practice would consider one user at a time and would choose that HARQ process corresponding to oldest available HARQ packet. The selected HARQ process might transmit a fresh packet, or it might retransmits packet that had previously been negatively acknowledged by the receiver.

For CSM, however, such a conventional approach to HARQ process selection could lead to significant inefficiencies. For example, if HARQ processes are selected by considering one user at a time, or by inflexibly selecting only the oldest HARQ packet, users having selected HARQ processes of disparate burst sizes may be grouped together for making simultaneous CSM transmissions. (The term "burst size" is used here to denote the number of allocated time-frequency units.)

If the simultaneous CSM transmissions are in fact constrained to use matched time-frequency resources, the mismatch in burst sizes will lead to inefficiencies. For example, CSM transmissions may be converted to single-user transmissions, thus giving up some capacity. Alternatively, a CSM group other than the highest ranked CSM group may need to be scheduled again giving rise to inefficiencies. In this latter case, HARQ process selection may need to be performed several times across different user groups thus leading to a potential increase in delay and/or complexity. Further, such matching may not yield desirable properties (e.g. maximize spectral efficiency or bandwidth utilization) thus reducing system performance.

We address these, and other problems, by introducing an approach to HARQ process selection that may deviate from a strict first-in, first-out policy. New processes may be selected instead of older unlocked processes even if there are waiting for transmission. Thus, for example, when two or more users have been grouped for simultaneous CSM transmission, our approach could permit the selection of new processes over older processes for one or more of the grouped CSM users in order to achieve greater efficiency.

Our new approach to HARQ process selection can also provide benefits even when CSM is not employed, i.e., when the time-frequency resources are allocated to a single user. In that context as well, it may be advantageous (provided that delay constraints are satisfied) to preferentially create new HARQ processes for a particular service data flow or connection in order to achieve higher spectral efficiency, even though older HARQ processes are queued for transmission.

For example, in some cases, such as when non-adaptive HARQ is employed, each retransmission may be constrained to use the same Modulation and Coding Scheme (MCS) as the initial transmission. However, the current channel conditions, the available time-frequency resources, or the available power budget might dictate the use of more efficient MCS. In such a case, the network might achieve higher efficiency by preferentially selecting a new HARQ process and carrying out transmissions using the current MCS.

Alternatively, if there are multiple older HARQ processes that have been queued, it could be advantageous to do process selection based on which process allows the most efficient transmission in view of, e.g., the MCS constraints for retransmissions, the available time-frequency resources, the available power budget, or combinations thereof.

In general, process selection according to our new approach may be carried out at the transmitting network node or at the receiving node. Of course if it is carried out at the receiver, signaling overhead such as a signaling channel will be utilized to communicate the decision to the transmitter. (In typical situations where HARQ process selection may be carried out at the receiver, an uplink transmission is contemplated, and the "transmitter" is the user.)

Figure 4:
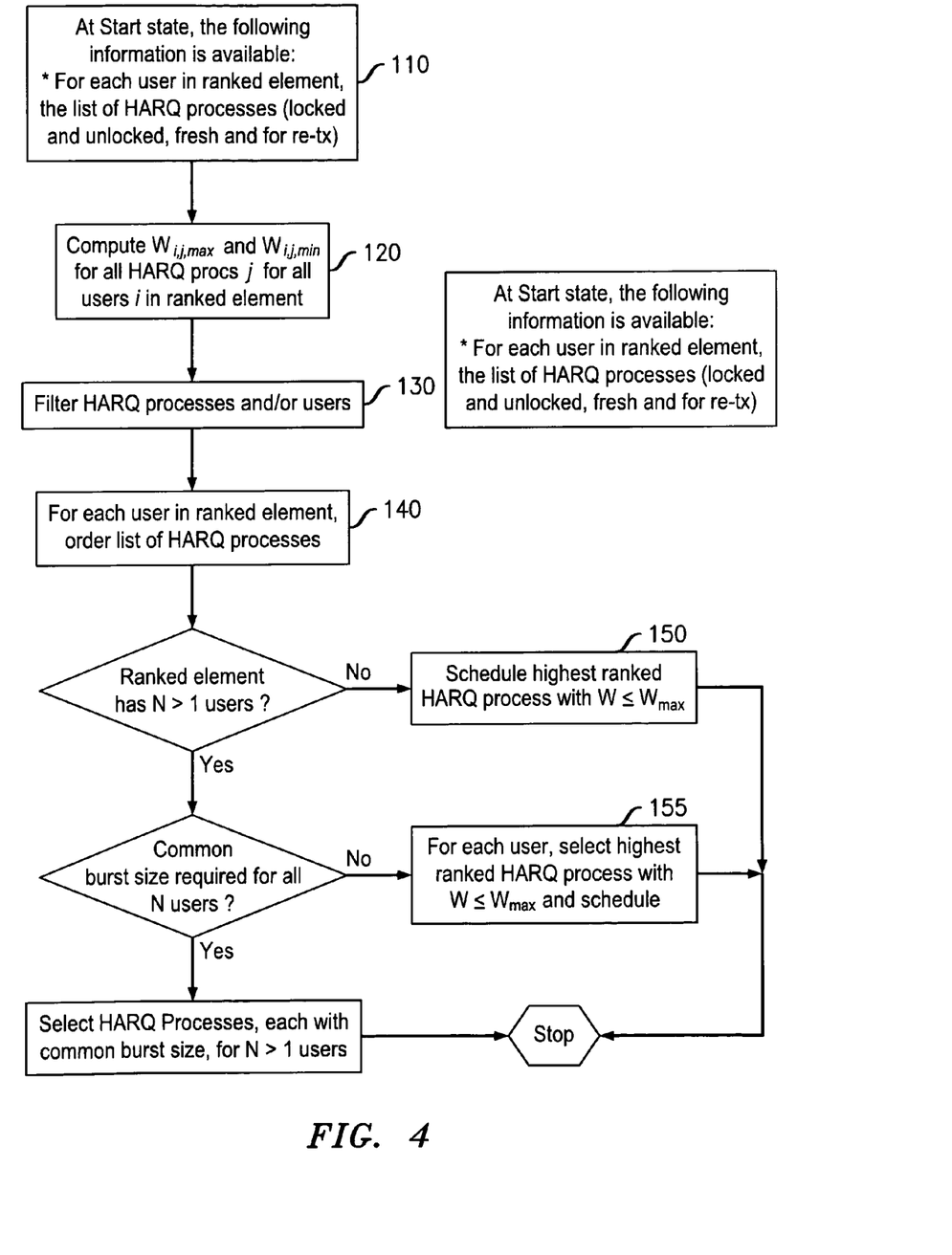
FIG. 4 is a flowchart of a HARQ process selection procedure according to the invention in an illustrative embodiment.

We turn now to FIG. 4, which illustrates a HARQ process selection procedure according to one embodiment of the invention applicable to CSM transmissions. We introduce the term "element" to denote the group of one, two, or more users that have been selected for scheduling of a CSM transmission. Those skilled in the art will appreciate that the steps outlined below are merely illustrative, and as literally set out below are not essential to the invention.

At block 110, the node responsible for process selection acquires a list of all existing HARQ processes for each user in the current element. (As noted earlier, the term "user" may also signify a connection.) If there are multiple users in the ranked element, a CSM transmission is indicated. At block 110, the node may also append fresh HARQ processes to the end of each list.

At block 120, the node determines the maximum and minimum resource, $W_{i,j,max}$ and $W_{i,j,min}$, respectively, that can be allocated to each HARQ process j for all users i in the element. The limits $W_{i,j,max}$ and $W_{i,j,min}$ may be determined on the basis, for example, of the maximum resource available in the current scheduling frame, or on the basis of a target resource allocation corresponding to the QoS requirement for example, or from both of the above.

Yet another factor that may be useful for determining $W_{i,j,max}$ and $W_{i,j,min}$, either alone or in combination with other factors, is the transmission status of the HARQ process as treated in the applicable standards. The "transmission status" defines whether the contemplated transmission is a new packet or a retransmission, and specifies the transmission index if it is a retransmission.

For example, the if non-adaptive HARQ with Chase Combining of HARQ retransmissions is employed, the retransmissions are required to span the same amount of resources as allocated to the initial packet. In such a case, $W_{i,j,max}$ and $W_{i,j,min}$ must both be set equal to the resource employed in the initial HARQ transmission.

Yet another factor that may be useful for determining $W_{i,j,max}$ and $W_{i,j,min}$ is the transmission feasibility. A HARQ process is deemed feasible if it is reasonably possible to guarantee a desired post-HARQ error rate or throughput by appropriate allocation of resources and MCS. It should be noted in this regard that feasibility in a particular instance might be affected by applicable QoS requirements. Thus, for example, a process that may soon violate QoS requirements could have less stringent feasibility checks or might not, in fact, be required to meet a feasibility test at all.

Figure 2:
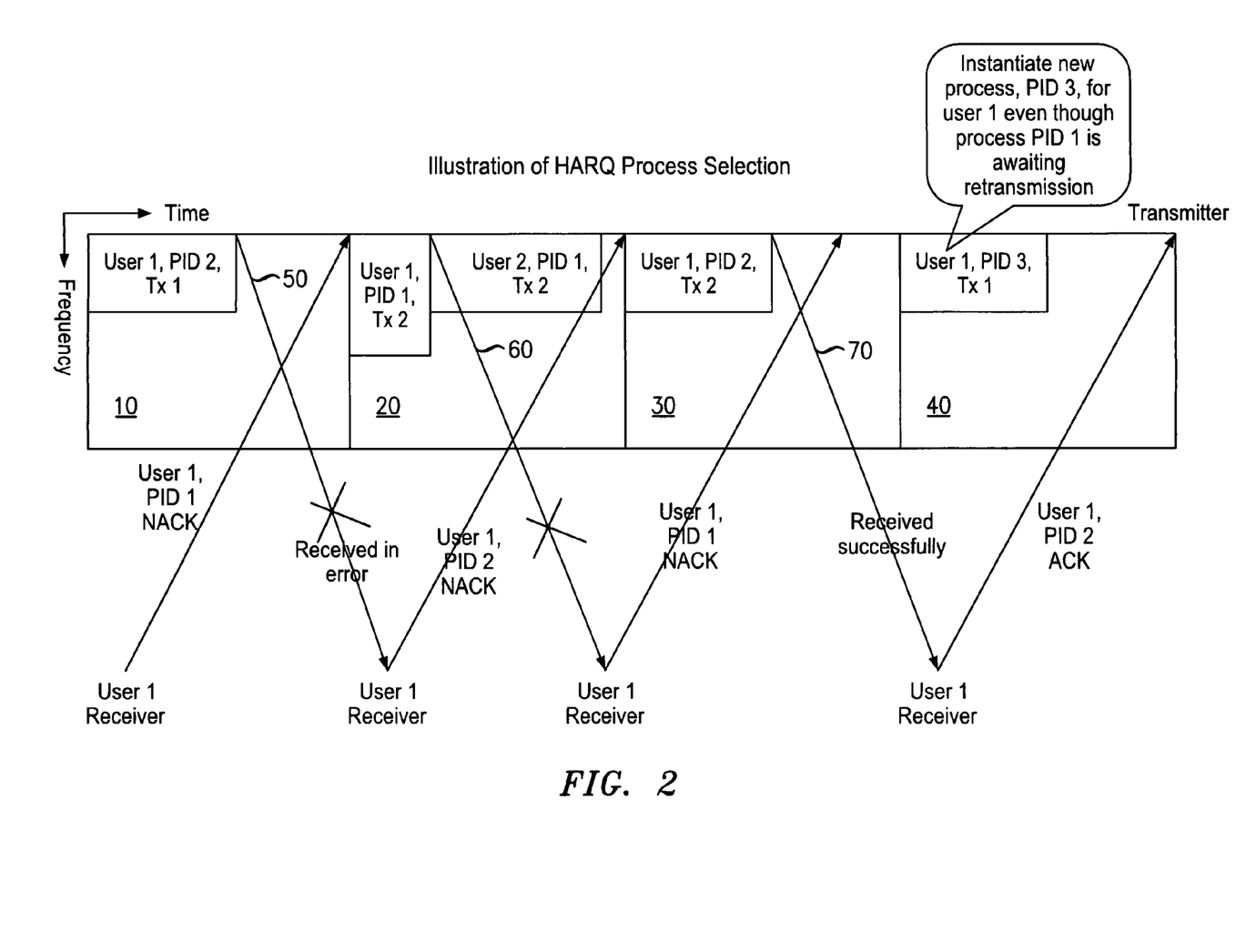
FIG. 2 is a schematic representation of resource allocation and message transmission in HARQ operation according to the invention in an illustrative embodiment.

FIG. 2 illustrates an example of HARQ process selection according to the present invention. Elements of the figure corresponding to elements of FIG. 1 are labeled with like reference numerals. It will be seen that at time-frequency block 40, a new process (User 1, PID 3) is instantiated even though a previous process for User 1, namely PID 1, is awaiting transmission. (As the corresponding NACK is no longer pending, but was received in block 30, this process is not locked in block 40.)

Figure 3:
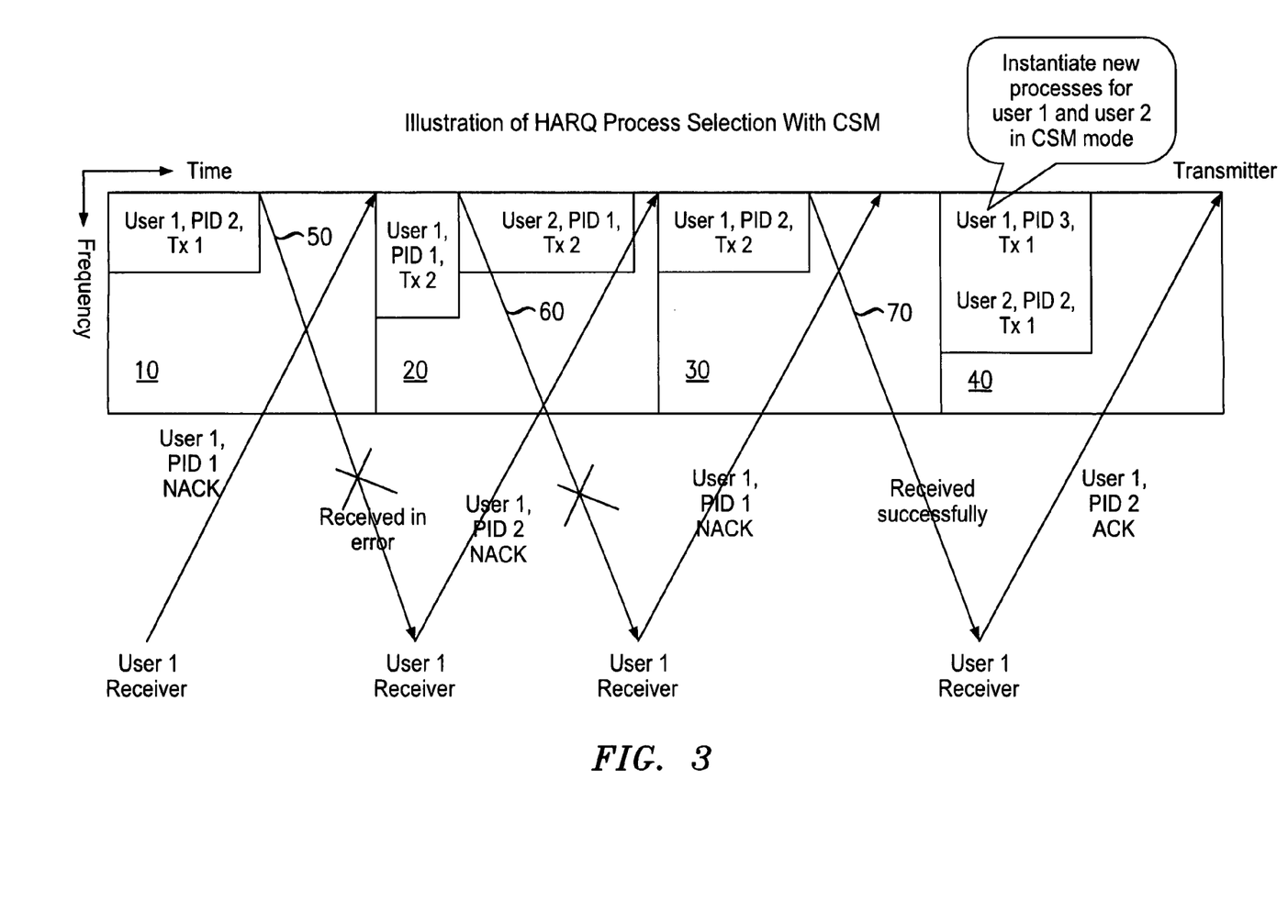
FIG. 3 is a schematic representation of resource allocation and message transmission in HARQ operation according to an illustrative embodiment that includes CSM.

FIG. 3 illustrates a further example of HARQ process selection according to the present invention. Elements of the figure corresponding to elements of FIGS. 1 and 2 are labeled with like reference numerals. It will be seen that at block 40, not only is the new process for User 1 instantiated, but moreover, a common block of time-frequency resource is allocated to a CSM user group consisting of User 1 and User 2.

At block 130, HARQ processes, HARQ users, or both, may be filtered. The filtered processes or users are effectively removed from scheduling consideration in the current frame (or other scheduling instance). For example, the filtering step might remove those HARQ processes that are locked since they are not eligible to be granted resources. A process may be considered as "locked", e.g., it has already been scheduled and is pending transmission in the current frame, or if the ACK/NACK feedback for the previous transmission attempt has yet to be received.

The filtering step might also remove those HARQ processes for which $W_{i,j,min} > W_{max}$, where $W_{max}$ represents the maximum resource that can be allocated to a user or connection. This quantity may be determined dynamically, based e.g. on the available resource remaining in the current frame, or on a target burst size. If after filtering, no processes remain for a user in the CSM group, that user is removed from the element.

At block 140, the node orders the list of HARQ processes belonging to each user that has survived the filtering process. By way of illustration, the ordering may be performed according to the time of initial packet transmission. This is advantageous because it helps to minimize re-transmission delays and out-of-sequence deliveries. Alternatively, the ordering may be performed according to QoS constraints such as rate or delay guarantees. Thus, for example, the delay requirements may be applied in such a way as to bound the degree to which a deviation from a first-in, first-out policy will be permitted.

At block 150, for an element containing only one user, the node will select the highest ranked HARQ process, provided the total bandwidth W (more precisely, the size of the resource unit allocated for the pertinent scheduling instance) actually allocated to the process is less than or equal to $W_{max}$.

If the element contains multiple users, the node will check whether a common burst size is required for all N users in the CSM user group. (Such a requirement may be specific to certain implementations or standards.) If the node determines that a common burst size is not required, it selects for each user, at block 155, the highest ranked HARQ process for which $W \leq W_{max}$. If, on the other hand, a common burst size is required for all users in the CSM user group, HARQ process selection is performed according to the flowchart depicted in FIG. 5 and described below.

Figure 5:
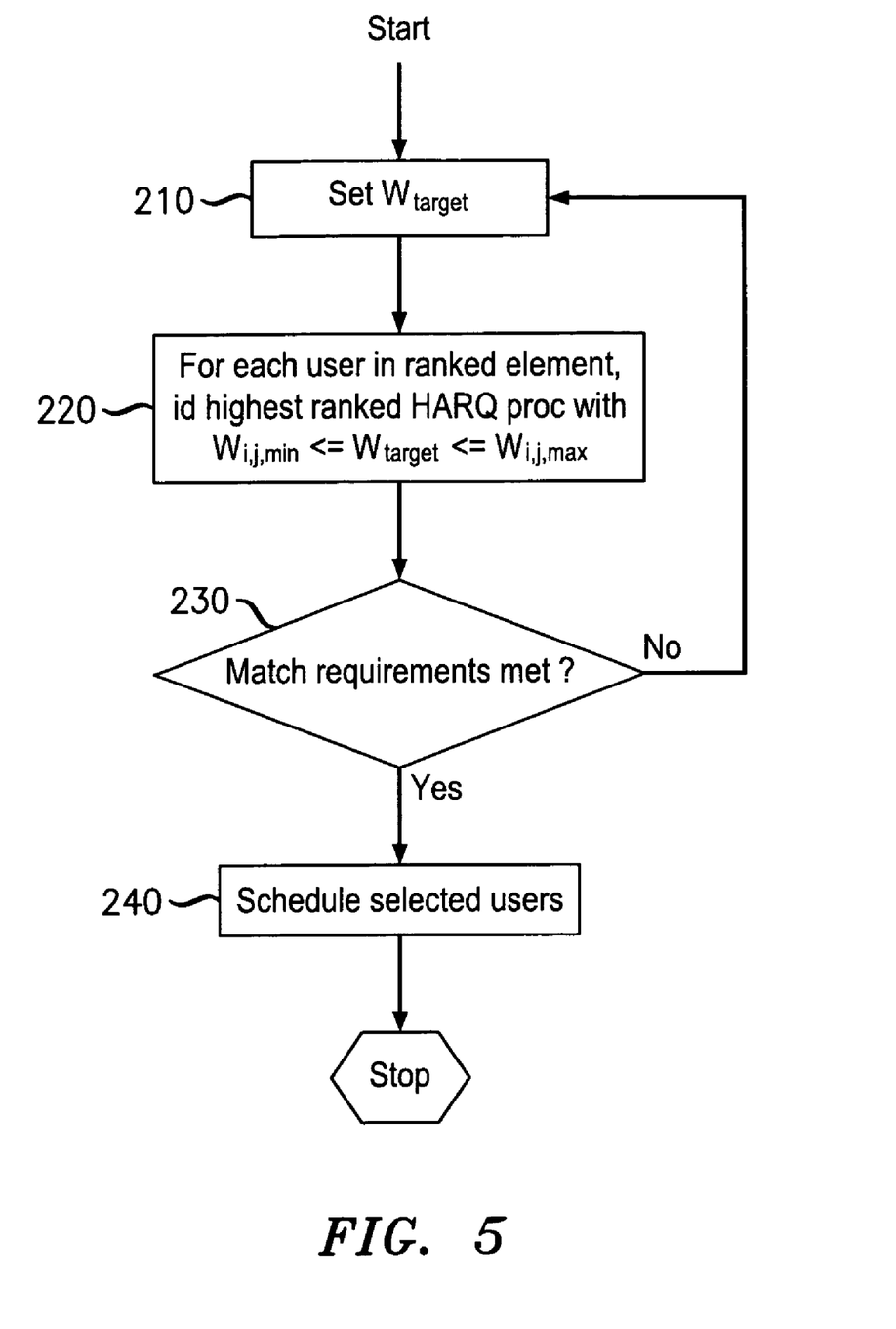
FIG. 5 is a flowchart of a HARQ process selection procedure accordign to an alternate embodiment of the invention, in which a CSM user group has a common burst size.

Turning now to FIG. 5, we describe an illustrative method of HARQ process selection for CSM user groups having common burst sizes.

At block 210, the node determines the target burst size, $W_{target}$, to be allocated for all N>1 users in the element. By way of illustration, $W_{target}$ may be initially set to the amount of resources, $W_{avail}$, made available by the scheduler so as to maximize the bandwidth utilization. Alternatively, $W_{target}$ may be set according to the resource requirements of one of the HARQ processes, e.g. a high priority HARQ process. In another example, $W_{target}$ may be set to a target burst size according to relevant QoS requirements, according to historical goodput, or both. In yet another example, $W_{target}$ may be set by considering the set of candidate HARQ processes for each user in the CSM group and selecting a value that meets a desired tradeoff among number of selected HARQ processes, bandwidth utilization, delay, and spectral efficiency.

At block 220, the highest ranked HARQ process j that meets the condition $W_{i,j,min} \leq W_{target} \leq W_{i,j,max}$ is identified for each user i.

At block 230, the selected HARQ processes are reviewed to verify whether various match requirements are met. For example, there may be a requirement to select a minimum of $n \leq N$ processes. In another example, the match requirement may be a linear or non-linear function of the number of selected HARQ processes and the common burst size.

If match requirements are met, then at block 240 the selected HARQ processes are scheduled and HARQ process selection ends. If match requirements are not met, a new $W_{target}$ is selected at block 210 and the process is repeated.

In one embodiment, the best $W_{target}$ is maintained after each unsuccessful iteration; after several iterations if a match has not been achieved, the best identified state can be used. In another embodiment, $W_{target}$ can be incremented or decremented by a fixed value from a starting value to an ending value and the best match can be selected at the conclusion.

EXAMPLE

We performed numerical simulations of a wireless communication network in which the methods described above were implemented. Key aspects of our system simulation methodology and related system simulation assumptions (including parameter values) are listed in Table 1 and Table 2.

TABLE 1

System parameters and assumptions, part 1.

| Parameter | Assumption |
|---|---|
| Link direction | Uplink |
| Duplexing method | TDD |
| Subchannelization | PUSC (non-adjacent subcarriers) |
| Transmission method | SIMO, CSM |
| CSM Group Size | 2 |
| MCS | QPSK ½, QPSK ¾, 16 QAM ½, 16 QAM ¾ |
| HARQ | Chase, maximum of 4 tx, target 1% post-HARQ error rate |
| MAP performance | 1% error rate |
| Scheduling | Proportional fair, non-frequency selective |
| Carrier reuse | 1 × 1, 1 × 3 |
| Receiver | MMSE |
| UL subframe duration (symbols) | 18 symbols with average of 2 symbols for overhead |

TABLE 1-continued

System parameters and assumptions, part 1.

| Parameter | Assumption |
|---|---|
| Power control | Open and closed loop accounting for full path loss |
| MAC header | 80 bits per MAC PDU |

TABLE 2

Simulation parameters and assumptions, part 2.

| Parameter | Assumption |
|---|---|
| Topology | 19 cells/57 cloverleaf sectors with wraparound |
| Bandwidth | 1x10, 1x20 MHz |
| Site-to-site distance | 0.78 km |
| Propagation formula | 141.0 + 35.2 * log10 (d_km) |
| RL antenna configuration | 1 Tx, 2 and 4 Rx (no correlation between Rx ant.) |
| MS transmit power | 23 dBm |
| MS antenna | Omnidirectional, 0 dBi antenna gain |
| BS antenna | 70° (3 dB beamwidth), 17 dBi gain, max attenuation 20 dB |
| Cable loss | 0.8 dB |
| Penetration/body loss | 10 dB/0 dB |
| BS noise figure | 4 dB |
| Shadow fading | σ = 8 dB, correlation of 0.5 and 1 for site-to-site and intra-cell, respectively |
| Channel mix | ITU Ped. A, 3 km/hr (30%), ITU Ped. B, 10 km/hr (30%), ITU Veh. A, 30 km/hr (20%), ITU Ped. A, 120 km/hr (10%), Rician, K = 10 dB, fd 1.5 Hz (10%) |
| Channel estimation margins | Channel specific based on link level simulations |
| Implementation margin | 1.5 dB for Ped. A 120, 0.5 dB for other models |
| Average # mobiles per sector | 15 |
| Link error prediction | EESM |

System Simulation Results

Table 3 summarizes the performance achieved in various scenarios with SIMO and CSM with constrained random grouping, where each result was generated to maximize sector throughputs while meeting the 3GPP2 fairness criteria and maintaining a maximum median IOT of 5.5 dB. As shown in the last column of the table, sector throughput gains of CSM relative to the respective SIMO deployment can vary widely from nearly single percentage points to over 60 percent. Further, note that in accordance with our design, the cell edge throughputs for CSM-enabled cases have been maintained.

TABLE 3

Average sector and cell edge throughput.

| Transmission mode | Carrier reuse | Number of receive antennas | Ave sector throughput (kbps) | 10%-ile user throughput (kbps) | Median interference over threshold (dB) | % sector throughput gain over SIMO |
|---|---|---|---|---|---|---|
| SIMO | ⅓ | 4 | 4662 | 58 | 0.2 | — |
| SIMO + CSM | ⅓ | 4 | 7749 | 71 | 3.5 | 66.2% |
| SIMO | ⅓ | 2 | 4043 | 39 | 4.7 | — |
| SIMO + CSM | ⅓ | 2 | 5361 | 49 | 5.5 | 32.6% |
| SIMO | 1/1 | 4 | 2012 | 70 | 5.5 | — |
| SIMO + CSM | 1/1 | 4 | 2387 | 91 | 5.4 | 18.6% |
| SIMO | 1/1 | 2 | 1318 | 46 | 5.4 | — |
| SIMO + CSM | 1/1 | 2 | 1395 | 49 | 5.4 | 5.8% |

What is claimed is:

1. A method for implementation of HARQ between a transmitting node and a receiving node in a communication network wherein HARQ data packets associated with one or more HARQ processes are transmitted using allocated resources, each HARQ process comprising a transmission of one or more new or retransmitted HARQ packets having a common destination, the method comprising, for at least one user selected for a scheduling instance:
 (a) appending one or more new candidate HARQ processes to a group of candidates that are queued for possible instantiation, said appending being permitted even if there are older processes with data waiting to be retransmitted;
 (b) ranking two or more processes queued for that user, said ranking carried out by applying a policy which can deviate from first-in-first-out processing of packets by permitting fresh HARQ processes to be instantiated ahead of HARQ processes awaiting retransmission; and
 (c) selecting one or more of the highest ranked HARQ processes for instantiation in the scheduling instance using allocated resources.

2. The method of claim 1, wherein ranking of HARQ processes is carried out by the transmitting node.

3. The method of claim 1, wherein ranking of HARQ processes is carried out by the receiving node and communicated to the transmitting node in order to instantiate at least one of the highest ranked processes.

4. The method of claim 1, wherein each of the HARQ processes selected for instantiation in the scheduling instance using the allocated resources comprises a transmission of one or more HARQ packets that belong to a common application in addition to having a common destination.

5. The method of claim 1, wherein:
 (a) the method further comprises filtering users and/or HARQ processes of users so as to eliminate identified users or HARQ processes from being scheduled in the current scheduling instance if they fail to satisfy filtering criteria;
 (b) the appending step comprises appending one or more new candidate HARQ processes to a group of remaining candidate users for possible instantiation, said appending being permitted even if there are older processes with data waiting to be retransmitted;
 (c) the ranking step comprises ranking the list of remaining processes for each candidate user; and
 (d) the selecting step comprises jointly selecting, for the current scheduling instance, at least one HARQ process and a bandwidth to be allocated to at least one candidate user, wherein the joint selection is based at least in part on a HARQ process priority and on a measure of efficiency in the utilization of bandwidth.

6. The method of claim 5, wherein the HARQ process priority is based, at least in part, on at least one of:
 current channel conditions, available time-frequency resources; a selected modulation and coding scheme, and an available power budget.

7. The method of claim 5, wherein the same resources are allocated to the selected HARQ processes of one or more candidate users.

8. The method of claim 5, wherein the ranking of each HARQ process is based, at least in part, on a time of initial transmission of such process.

9. The method of claim 5, wherein the selecting step comprises selecting a new HARQ process for at least one user for which an existing HARQ process with a pending retransmission is already available.

* * * * *